(12) United States Patent
Naganishi et al.

(10) Patent No.: US 10,882,476 B2
(45) Date of Patent: Jan. 5, 2021

(54) VEHICULAR CIRCUIT BODY

(71) Applicant: YAZAKI CORPORATION, Tokyo (JP)

(72) Inventors: Yukinari Naganishi, Shizuoka (JP); Yasuyuki Saito, Shizuoka (JP); Taku Furuta, Shizuoka (JP); Noriaki Sasaki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/231,505

(22) Filed: Dec. 22, 2018

(65) Prior Publication Data

US 2019/0126863 A1 May 2, 2019

Related U.S. Application Data

(63) Continuation of application No. PCT/JP2017/023315, filed on Jun. 23, 2017.

(30) Foreign Application Priority Data

Jun. 24, 2016 (JP) .................................. 2016-125896

(51) Int. Cl.
*B60R 16/023* (2006.01)
*B60R 16/02* (2006.01)
(Continued)

(52) U.S. Cl.
CPC ............ *B60R 16/0238* (2013.01); *B60L 1/00* (2013.01); *B60R 16/02* (2013.01);
(Continued)

(58) Field of Classification Search
CPC ... B60R 16/033; B60R 16/02; B60R 16/0239; B60R 16/0215; B60R 16/03; B60R 16/0238; B60R 16/0207; B60K 37/00; H04L 12/42; H04L 67/12; H04L 12/10; H04L 12/66; H01B 7/0045; H01R 9/2483;
(Continued)

(56) References Cited

U.S. PATENT DOCUMENTS 3,715,627 A 2/1973 D'Ausilio
5,324,203 A 6/1994 Sano et al.
(Continued)

FOREIGN PATENT DOCUMENTS

DE  41 02 659 A1  8/1992
DE  10 2012 200 979 A1  7/2013
(Continued)

OTHER PUBLICATIONS

US 5,875,923 A1, 04/2005, Egawa et al. (withdrawn)
(Continued)

*Primary Examiner* — Anatoly Vortman
(74) *Attorney, Agent, or Firm* — Kenealy Vaidya LLP

(57) ABSTRACT

A vehicular circuit body includes a plurality of backbone control boxes, a backbone trunk line portion connecting the backbone trunk line portions to each other, and a branch line sub-harness. A trunk includes has a power source line and a communication line, and a control includes a trunk line connection portion and a branch line connection portion.

10 Claims, 5 Drawing Sheets

(51) Int. Cl.
*H01B 7/00* (2006.01)
*B60R 16/03* (2006.01)
*B60L 1/00* (2006.01)
B60K 37/00 (2006.01)

(52) U.S. Cl.
CPC .......... *B60R 16/0215* (2013.01); *B60R 16/03* (2013.01); *H01B 7/0045* (2013.01); *B60K 37/00* (2013.01); *H01B 7/00* (2013.01)

(58) Field of Classification Search
CPC .... H01R 2201/26; H01R 13/64; H01R 13/62; H01R 13/44; H02G 3/32; H02G 3/081
USPC ...................................................... 361/622
See application file for complete search history.

(56) References Cited

U.S. PATENT DOCUMENTS

| | | | |
|---|---|---|---|
| 5,623,169 | A | 4/1997 | Sugimoto et al. |
| 5,675,189 | A * | 10/1997 | Anma ................. B60R 16/0315 307/9.1 |
| 5,759,050 | A | 6/1998 | Matsuoka et al. |
| 5,818,673 | A | 10/1998 | Matsumaru et al. |
| 5,990,573 | A | 11/1999 | Granitz et al. |
| 6,127,741 | A * | 10/2000 | Matsuda .................... H02J 1/08 307/10.6 |
| 6,182,807 | B1 | 2/2001 | Saito et al. |
| 6,291,770 | B1 | 9/2001 | Casperson |
| 6,494,723 | B2 | 12/2002 | Yamane et al. |
| 6,501,574 | B1 | 12/2002 | Unno et al. |
| 6,650,345 | B1 | 11/2003 | Saito et al. |
| 6,791,207 | B2 * | 9/2004 | Yoshida ............. B60R 16/0315 307/10.1 |
| 6,935,790 | B2 | 8/2005 | Ozaki |
| 6,945,704 | B2 | 9/2005 | Yamaguchi |
| 7,039,511 | B1 | 5/2006 | Kreuz et al. |
| 7,286,044 | B2 * | 10/2007 | Yanagida ................ H04B 3/548 307/10.1 |
| 7,423,519 | B2 * | 9/2008 | Yanagida ................ H04B 3/548 340/12.32 |
| 7,551,999 | B2 | 6/2009 | Uraki |
| 7,833,033 | B2 | 11/2010 | McMahon et al. |
| 7,852,206 | B2 * | 12/2010 | Yanagida ................ H04B 3/548 340/12.32 |
| 7,931,479 | B1 | 4/2011 | De La Reza et al. |
| 8,248,971 | B2 | 8/2012 | Goto et al. |
| 8,304,928 | B2 * | 11/2012 | Nagasawa ........... B60R 16/0315 307/9.1 |
| 8,929,732 | B2 | 1/2015 | Yuki et al. |
| 9,505,358 | B2 * | 11/2016 | Ichikawa ............ B60R 16/0207 |
| 9,825,394 | B2 * | 11/2017 | Naganishi .......... B60R 16/0207 |
| 10,266,130 | B2 * | 4/2019 | Saito ........................ H02G 3/16 |
| 2001/0023786 | A1 | 9/2001 | Maynard et al. |
| 2002/0113441 | A1 | 8/2002 | Obayashi |
| 2003/0215235 | A1 | 11/2003 | Norizuki et al. |
| 2004/0064539 | A1 | 4/2004 | Itoi |
| 2004/0077207 | A1 | 4/2004 | Ice |
| 2004/0227402 | A1 | 11/2004 | Fehr et al. |
| 2006/0031590 | A1 | 2/2006 | Monette et al. |
| 2006/0197378 | A1 | 9/2006 | Nagasawa et al. |
| 2009/0015976 | A1 * | 1/2009 | Hara ..................... B60R 16/023 361/64 |
| 2010/0131816 | A1 | 5/2010 | Yamamoto et al. |
| 2010/0215043 | A1 | 8/2010 | Hisada |
| 2010/0216336 | A1 | 8/2010 | Quiter et al. |
| 2011/0088944 | A1 | 4/2011 | Ogue et al. |
| 2011/0292663 | A1 | 12/2011 | Fredrickson |
| 2012/0290692 | A1 * | 11/2012 | Reich .................... H04L 12/437 709/220 |
| 2012/0305308 | A1 | 12/2012 | Toyama et al. |
| 2015/0241498 | A1 | 8/2015 | Watanabe |
| 2015/0308998 | A1 | 10/2015 | Suzuki et al. |
| 2015/0309163 | A1 | 10/2015 | Van Der Velde et al. |
| 2015/0349471 | A1 | 12/2015 | Maki et al. |
| 2015/0360627 | A1 | 12/2015 | Sasaki et al. |
| 2016/0059708 | A1 | 3/2016 | Iwasaki et al. |
| 2016/0177907 | A1 | 6/2016 | Betscher et al. |
| 2017/0057434 | A1 | 3/2017 | Nohara et al. |
| 2017/0201584 | A1 | 7/2017 | Endo |

FOREIGN PATENT DOCUMENTS

| | | |
|---|---|---|
| EP | 0 507 225 A1 | 10/1992 |
| JP | 64-7712 U | 1/1989 |
| JP | 2-25343 U | 2/1990 |
| JP | 5-71058 U | 9/1993 |
| JP | 6-171438 A | 6/1994 |
| JP | 7-335367 A | 12/1995 |
| JP | 8-2290 A | 1/1996 |
| JP | 8-273718 A | 10/1996 |
| JP | 9-134307 A | 5/1997 |
| JP | 9-275632 A | 10/1997 |
| JP | 10-84619 A | 3/1998 |
| JP | 11-154566 A | 6/1999 |
| JP | 2000-59409 A | 2/2000 |
| JP | 2000-78179 A | 3/2000 |
| JP | 2003-32853 A | 1/2003 |
| JP | 2003-175781 A | 6/2003 |
| JP | 2003-218904 A | 7/2003 |
| JP | 2003-332981 A | 11/2003 |
| JP | 2004-104564 A | 4/2004 |
| JP | 2004-306697 A | 11/2004 |
| JP | 2005-78962 A | 3/2005 |
| JP | 2006-6069 A | 1/2006 |
| JP | 2006-191727 A | 7/2006 |
| JP | 2006-220857 A | 8/2006 |
| JP | 2007-201932 A | 8/2007 |
| JP | 2007-305379 A | 11/2007 |
| JP | 2008-49982 A | 3/2008 |
| JP | 2008-284981 A | 11/2008 |
| JP | 2008-306592 A | 12/2008 |
| JP | 2009-94731 A | 4/2009 |
| JP | 2009-286288 A | 12/2009 |
| JP | 2010-12868 A | 1/2010 |
| JP | 2010-120545 A | 6/2010 |
| JP | 2011-20523 A | 2/2011 |
| JP | 2011-165354 A | 8/2011 |
| JP | 2014-191997 A | 10/2014 |
| JP | 2015-113101 A | 6/2015 |
| JP | 2015-196447 A | 11/2015 |
| JP | 2015-227089 A | 12/2015 |
| JP | 2016-4686 A | 1/2016 |
| JP | 2016-19176 A | 2/2016 |
| JP | 2016-43882 A | 4/2016 |
| JP | 2016-110811 A | 6/2016 |
| WO | 00/38953 A1 | 7/2000 |
| WO | 00/52836 A1 | 9/2000 |
| WO | 2004/089696 A1 | 10/2004 |
| WO | 2004/103771 A2 | 12/2004 |
| WO | 2007/056696 A2 | 5/2007 |
| WO | 2014/077330 A1 | 5/2014 |
| WO | 2015/186837 A1 | 12/2015 |

OTHER PUBLICATIONS

International Search Report and Written Opinion of the International Search Report for PCT/JP2017/023266 dated Sep. 19, 2017.
International Search Report and Written Opinion of the International Search Report for PCT/JP2017/023307 dated Sep. 19, 2017.
International Search Report and Written Opinion of the International Search Report for PCT/JP2017/023267 dated Sep. 19, 2017.
International Search Report and Written Opinion of the International Search Report for PCT/JP2017/023269 dated Sep. 19, 2017.
International Search Report and Written Opinion of the International Search Report for PCT/JP2017/023303 dated Sep. 19, 2017.
International Search Report and Written Opinion of the International Search Report for PCT/JP2017/023305 dated Sep. 19, 2017.
International Search Report and Written Opinion of the International Search Report for PCT/JP2017/023306 dated Sep. 19, 2017.
International Search Report and Written Opinion of the International Search Report for PCT/JP2017/023309 dated Sep. 19, 2017.

(56) References Cited

OTHER PUBLICATIONS

International Search Report and Written Opinion of the International Search Report for PCT/JP2017/023312 dated Sep. 19, 2017.
International Search Report and Written Opinion of the International Search Report for PCT/JP2017/023313 dated Sep. 19, 2017.
International Search Report and Written Opinion of the International Search Report for PCT/JP2017/023314 dated Sep. 19, 2017.
International Search Report and Written Opinion of the International Search Report for PCT/JP2017/023315 dated Sep. 19, 2017.
International Search Report and Written Opinion of the International Search Report for PCT/JP2017/023316 dated Sep. 19, 2017.
Cambridge English Dictionary, the definition of "Terminal", pp. 1-11.

* cited by examiner

# VEHICULAR CIRCUIT BODY

CROSS-REFERENCE TO RELATED APPLICATIONS

This is a continuation of International Application No. PCT/JP2017/023315 filed on Jun. 23, 2017, and claims priority from Japanese Patent Application No. 2016-125896 filed on Jun. 24, 2016, the entire content of which is incorporated herein by reference.

TECHNICAL FIELD

The present invention relates to a vehicular circuit body routed in a vehicle.

BACKGROUND ART

In a vehicle, for example, source power is required to be appropriately supplied to a large number of various electric components from an alternator (generator) or a battery which is a main power source. A system used to supply such source power is also required to have a function of switching between ON and OFF of the supply of power as necessary, or a function of cutting off a current for each system in a case where an excessive current flows through an electric component.

In a general vehicle, a wire harness which is an aggregate of a plurality of electric wires is routed on the vehicle, and a main power source is connected to electric components at each location via the wire harness so that power is supplied thereto. Generally, a junction block is used to distribute source power to a plurality of systems, a relay box is used to control ON and OFF of the supply of power for each system, or a fuse box is used to protect each electric wire or a load of the wire harness.

For example, a wire harness disclosed in PTL 1 includes a network transmission path and a circuit for providing power, GND and other signals. Further, the wire harness includes a wire harness trunk line, a sub-wire harness, an optional sub-wire harness, and a network hub device.

CITATION LIST

Patent Literature

[PTL 1] JP-A-2005-78962

SUMMARY OF INVENTION

Technical Problem

However, in recent years, as the number of electric components mounted on a vehicle body increases, the structure of the wire harness routed on the vehicle body tends to be complicated. Since a diameter of each electric wire forming the wire harness or the number of electric wires increases due to an increase in the number of electric components mounted on a vehicle, there is a tendency that a size of the entire wire harness increases or a weight thereof increases. The types and the number of components of wire harness to be manufactured increase due to a difference between vehicle models mounted with a wire harness or increases in types of optional electric components mounted on a vehicle, and thus it is difficult to share the components forming the wire harness, and component cost or manufacturing cost increases.

In a work process of manufacturing a wire harness, in order to finish the wire harness in a predetermined routing shape, a bundle of a plurality of electric wires forming the wire harness is pulled around over a long distance along a path which is designated in advance, and thus a lot of work time is required. Since almost all of electric wires are collected at a trunk line portion of the wire harness, the number of bundled electric wires increases, and thus a weight thereof increases.

For example, in a case where a new electric component which is not expected at initial design is mounted on a vehicle, a new electric wire is required to be added to a wire harness in order to secure a path along which a special signal is transmitted between the electric component and another electric component or to supply source power thereto. However, a wire harness has a complex structure or shape, and it is very difficult to add other electric wires to the existing wire harness in the future. Therefore, a new wire harness having differing type or component number is required to be designed so as to be manufactured as a separate product.

The present invention has been made in consideration of the above-described circumstances, and an object thereof is to provide a vehicular circuit body in which a structure for electrical connection between various electric components and a power source on a vehicle and between the electric components, particularly, a configuration of a trunk line portion is simplified and a new electric wire may be easily added.

Solution to Problem

In order to achieve the above object, a vehicular circuit body according to the present invention is characterized by the following (1) to (7).

(1) A vehicular circuit body provided in a vehicle, including:
a plurality of control units;
a trunk line that connects the plurality of control units to each other; and
a branch line that directly or indirectly connects one of the plurality of control units to an accessory, in which
the trunk line has a power source line and a communication line, and
the control unit has a trunk line connection portion to which the trunk line is connected, and a branch line connection portion to which the branch line is connected.

(2) In the vehicular circuit body according to the above (1),
the plurality of control units include:
a first control unit; and
a second control unit that is disposed to be separated from the first control unit in a front or rear direction of the vehicle, and
in which the trunk line is configured by a first trunk line that connects the first control unit and the second control unit to each other.

(3) In the vehicular circuit body according to the above (2),
each of the plurality of control units further includes:
a third control unit that is disposed to be separated from the first control unit in a vehicle width direction of the vehicle; and
a fourth control unit that is disposed to be separated from the first control unit in the vehicle width direction, and at a position that is on a side opposite to the third control unit, and the trunk line further includes:

a second trunk line that connects the first control unit and the third control unit to each other; and a third trunk line that connects the first control unit and the fourth control unit to each other.

(4) In the vehicular circuit body according to any one of the above (1) to (3), the vehicle has a first region including a vehicle interior, and a second region that is different from the first region, the plurality of control units are disposed in the first region, and one of the plurality of control units has a power input terminal to which power is supplied from a power source, and the one control unit supplies the power that is received from the power input terminal, to the trunk line.

(5) In the vehicular circuit body according to any one of the above (1) to (4), the power source line has a first power source line, and a second power source line that is used as a backup for the first power source line.

(6) In the vehicular circuit body according to the above (5), each of the first power source line and the second power source line is configured by a strip metal material having a flat sectional shape, and the trunk line has a structure in which the metal materials of the first power source line and the second power source line are stacked in a thickness direction with an insulator interposed therebetween.

(7) In the vehicular circuit body according to any one of the above (1) to (6), the trunk line further includes an earth line.

According to the vehicular circuit body having the configuration of the above (1), it is possible to provide a vehicular circuit body that may simplify the configuration of the trunk line portion and may easily add new wires.

According to the vehicular circuit body having the configuration of the above (2), since the first and second control units are disposed in the front-to-rear direction of the vehicle, it is easy to supply power in the front-to-rear direction of the vehicle and transmit and receive communication data by using the trunk line connecting these control units.

According to the vehicular circuit body having the configuration of the above (3), since the third and fourth control units are disposed in the vehicle width direction, for example it is easy to deploy the branch lines to accessories provided at the side of the vehicle According to the vehicular circuit body having the configuration of the above (4), power of the power source is supplied to the trunk line via the power input terminal and the control unit. Therefore, even in a case where the shape and structure of the power cable connected to the power input terminal and the trunk line are different, power may be supplied. Thereby, for example, the trunk line of a special shape does not need to penetrate through the dash panel of the vehicle body, and the installation work of the portion penetrating through the dash panel becomes easy.

According to the vehicular circuit body having the configuration of the above (5), in a case where some trouble occurs and the power supply to the first power source line abnormally stops, it is possible to secure a route for backing up the power source by using the second power source line.

According to the vehicular circuit body having the configuration of the above (6), since a plurality of band-like metallic materials are laminated, even in a case where the sectional area of the trunk line increases in order to allow passage of a large power source current, the bending in the thickness direction becomes relatively easy and the work for arranging along the desired routing path on the vehicle body becomes easy.

According to the vehicular circuit body having the configuration of the above (7), when the control units are connected by a trunk line, it is possible to transmit a power source current and communication between the control units and to form a common ground. It is possible to develop at least one of the power source current, communication signal, and ground to each branch line via the control unit.

Advantageous Effects of Invention

According to the vehicular circuit body of the present invention, the structure for electrical connection between various electric components and the power source on the vehicle and for the electrical connection between the electric components, particularly the configuration of the trunk line portion is simplified, and the addition of new electric wires becomes easy.

As mentioned above, the present invention has been described briefly. Further, details of the present invention will become more apparent by reading through modes for carrying out the invention (hereinafter, referred to as "embodiments") described below with reference to the accompanying drawings.

DESCRIPTION OF EMBODIMENTS

Specific embodiments relating to the present invention will be described below with reference to drawings.

Figure 1:
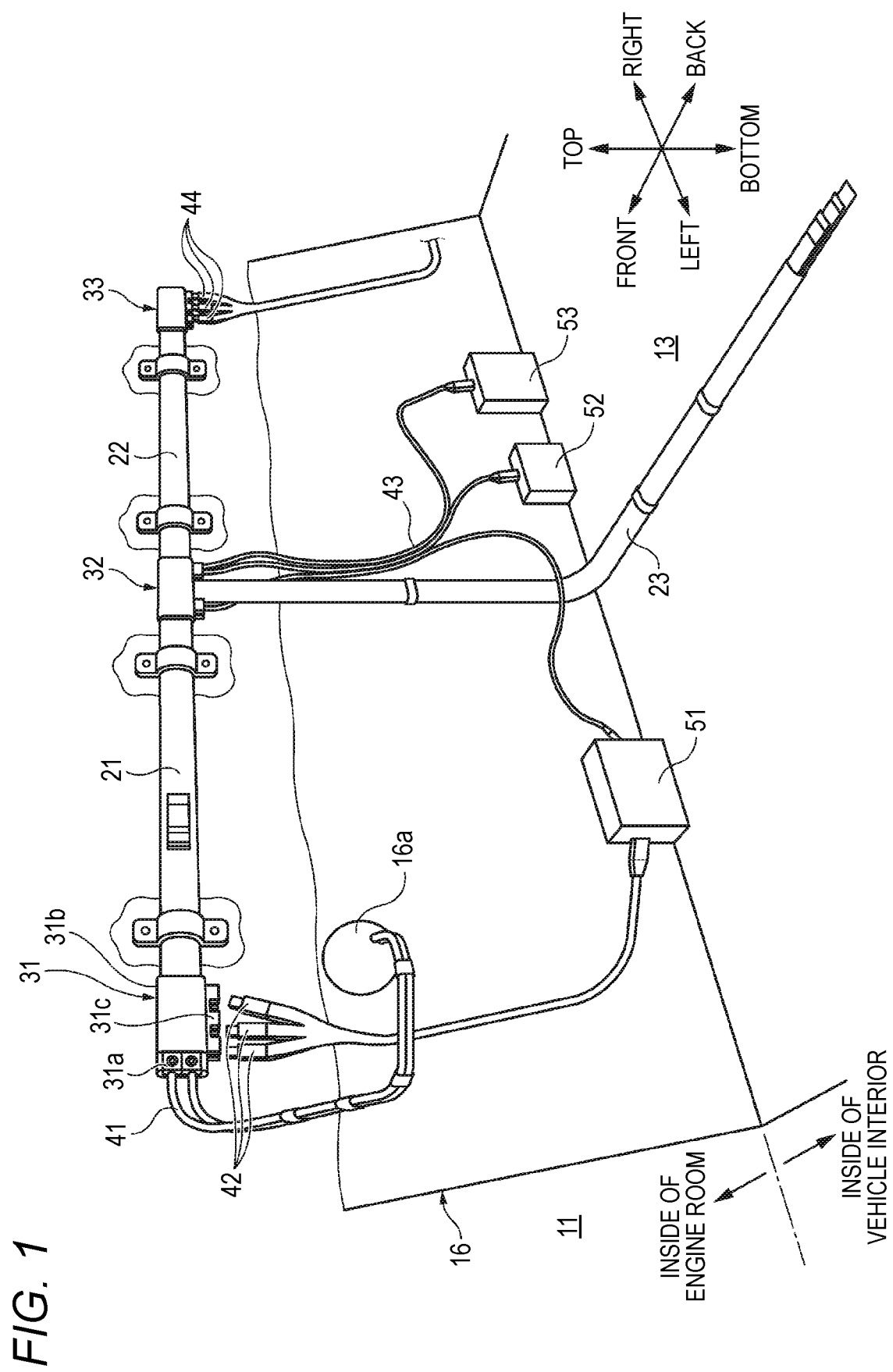
FIG. 1 is a perspective view illustrating a configuration example of main portions of an on-vehicle device including a vehicular circuit body according to an embodiment of the present invention.

First, a configuration example of main portions will be described. FIG. 1 illustrates a configuration example of the main portions of an on-vehicle device including a vehicular circuit body according to an embodiment of the present invention. The constituent elements in the vicinity of one backbone control box 31 illustrated in FIG. 1 are extracted and illustrated in FIG. 2. FIGS. 3A, 3B, 3C, and 3D show the plan view, the front view, the bottom view, and the right-side view of the backbone control box 31, respectively.

The vehicular circuit body illustrated in FIG. 1 supplies power of a main power source such as an on-vehicle battery to auxiliary devices of various parts of a vehicle body, that is, various electric components and is used as a transmission line necessary for exchanging signals between electric components. That is, although the vehicular circuit body is functionally similar to a general wire harness, the structure thereof is largely different from the general wire harness.

The on-vehicle device illustrated in FIG. 1 represents a configuration on the vehicle interior side in the vicinity of a dash panel 16 that partitions an engine room 11 and a vehicle interior (occupant compartment) 13 of the vehicle body. As illustrated in FIG. 1, a lean hose (not illustrated) as a reinforcement material is provided on an instrument panel portion (portion of the instrument panel) slightly behind the dash panel 16 so as to extend in the left-right direction (vehicle width direction) of the vehicle body. In the vicinity of the lean hose, a part of constituent elements of the vehicular circuit body is disposed. The vehicular circuit body in a portion extending in the left-right direction of the vehicle body may be fixed to the lean hose, fixed to the dash panel 16, or may be fixed to a dedicated fixture.

The vehicular circuit body illustrated in FIG. 1 includes a plurality of backbone trunk line portions 21, 22, and 23 and a plurality of backbone control boxes 31, 32, and 33. Each of the backbone trunk line portions 21, 22, and 23 includes a line such as a power source line, a ground line, a communication line, or the like. The power source line and the ground line in each backbone trunk line portion are realized by adopting a band-like metal material (for example, copper or aluminum) having a flat cross section and stacking these metal materials in the thickness direction in a state of being electrically insulated from each other. As a result, it is possible to allow the passage of a large current, and the bending process with respect to the thickness direction becomes relatively easy.

The backbone trunk line portions 21 and 22 are disposed linearly in the left-right direction so as to be substantially parallel to the lean hose at a position above the lean hose at a location along the surface of the dash panel 16. The backbone trunk line portion 23 is disposed substantially at the center in the left-right direction of the vehicle body and linearly extends in the vertical direction at a portion along the surface of the dash panel 16. The backbone trunk line portion 23 is bent in the thickness direction by approximately 90 degrees in the vicinity of the boundary between the dash panel 16 and the floor in the vehicle interior and is disposed so as to extend in the front-to-rear direction of the vehicle body along the floor in the vehicle interior. The backbone trunk line portions 21 and 22 may be fixed to the lean hose.

The backbone control box 32 (first control unit) is disposed substantially at the center in the left-right direction of the vehicle body, the backbone control box 31 (second control unit) is disposed near the left end in the left-right direction, and the backbone control box 33 (third control unit) is disposed near the right end in the left-right direction.

The left end of the backbone trunk line portion 21 (first trunk line) is connected to the right end of the backbone control box 31, and the right end of the backbone trunk line portion 21 is connected to the left end of the backbone control box 32. The left end of the backbone trunk line portion 22 (second trunk line) is connected to the right end of the backbone control box 32, and the right end of the backbone trunk line portion 22 is connected to the left end of the backbone control box 33. The front end of the backbone trunk line portion 23 (third trunk line) is connected to the lower end of the backbone control box 32.

That is, the backbone trunk line portions 21 to 23 and the backbone control boxes 31 to 33 are configured in a shape resembling a T shape as illustrated in FIG. 1. The internal circuits of the backbone trunk line portions 21 to 23 are in a state of being electrically connected with each other via the backbone control box 32.

Figure 2:
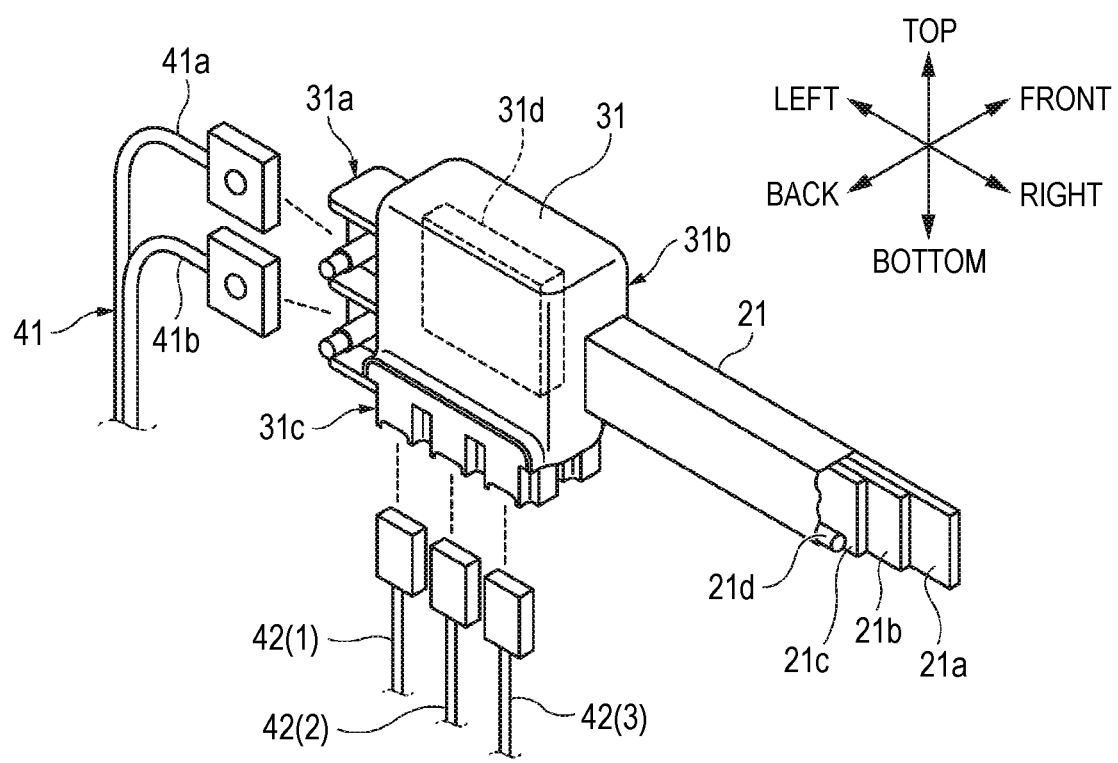
FIG. 2 is a perspective view illustrating a configuration in the vicinity of one backbone control box 31, 32, 33 illustrated in FIG. 1.
Figure 3A:
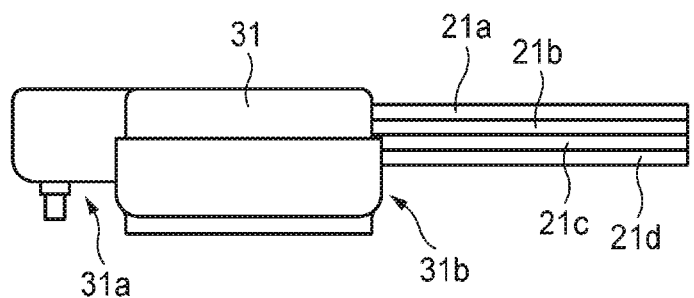
FIGS. 3A, 3B, 3C, and 3D are a plan view, a front view, a bottom view, and a right-side view illustrating the backbone control box 31, respectively.
Figure 3B:
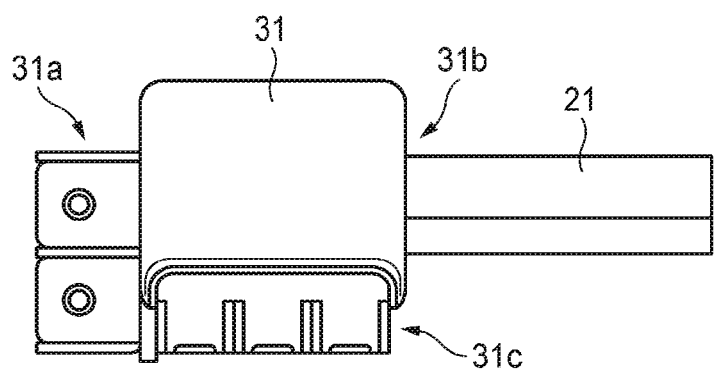
Figure 3D:
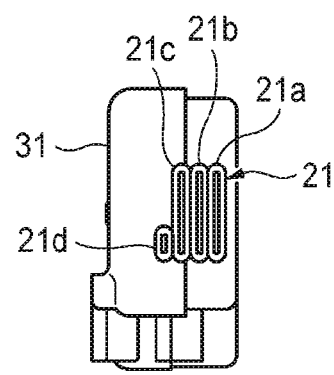
Figure 3C:
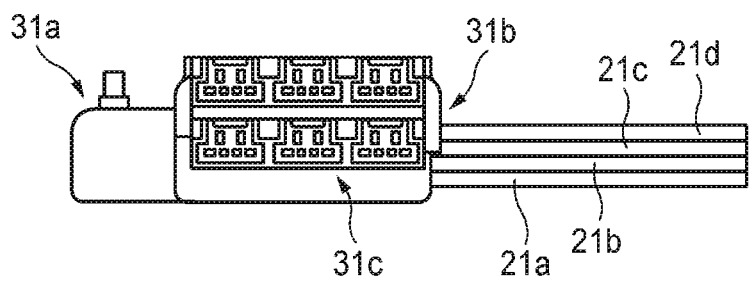

Next, details of the vicinity of the backbone control box 31 will be described. The backbone control box 31 disposed on the left side of the vehicle body is provided with a main power source connection portion 31a, a trunk line connecting portion 31b, and a branch line connection portion 31c. As illustrated in FIG. 2, a main power source cable 41 is connected to the main power connection portion 31a of the backbone control box 31, the left end of the backbone trunk line portion 21 is connected to the trunk line connection portion 31b, and a plurality of branch line sub-harnesses 42(1), 42(2), and 42(3) are respectively connected to the branch line connection portion 31c.

As illustrated in FIGS. 2 and 3, the backbone trunk line portion 21 includes power source lines 21a and 21b, a ground line 21c, and a communication line 21d. The main power source cable 41 includes a power source line 41a and a ground line 41b. Among the two power source lines 21a and 21b included in the backbone trunk line portion 21, one power source line 21a is used as a path for supplying power from the main power source. The other power source line 21b is used as a path for supplying the backup power source power when an abnormality occurs.

Inside the backbone control box 31, a relay circuit 31d for connecting the power source system, the earth system, and the communication system of respective circuits between the main source supply cable 41, the backbone trunk line portion 21, and the branch line sub-harness 42 are included. The relay circuit 31d includes a semiconductor switch having functions of a fusible link and a relay. The fusible link shuts off the current in a case where an excessive power source current flows. The relay has a function of switching ON/OFF of conduction as necessary for each system. The relay circuit 31d is formed by circuits and bus bars formed on the printed circuit board in the backbone control box 31.

As illustrated in FIG. 2, the shape and structure of the backbone trunk line portion 21 and the main power source cable 41 are largely different, but by interposing the relay circuit 31d of the backbone control box 31, it is possible to easily connect the circuit of the backbone trunk line portion 21 and the circuit of the main power source cable 41.

The main power source cable 41 connects the terminals connected to each tip of the power source line 41a and the ground line 41b to the terminals of the main power source connection portion 31a and fixing by using bolts and nuts so that these circuits may be connected. The power source lines 21a and 21b and the ground line 21c of the backbone trunk line portion 21 are respectively connected to the circuit on the printed circuit board in the backbone control box 31 and fixed by using, for example, bolts and nuts. The communication line 21d is connected to a circuit on the printed circuit board in the backbone control box 31 by using a connector. The connecting points of the power source lines 21a and 21b and the earth line 21c may also be easily attached and detached by adopting a connector.

The connectors provided at the respective tips of the branch line sub-harnesses 42(1) to 42(3) are detachable with respect to the branch line connection portion 31c, and circuits may be connected as necessary. Each of the branch line sub-harnesses 42(1) to 42(3) is configured to include all of the power source line, earth line, communication line, or a part thereof. In the backbone control box 31 illustrated in FIG. 3, since the branch line connection portion 31c has six connectors, up to six branch line sub-harnesses 42 may be connected.

As illustrated in FIG. 1, by combining the backbone trunk line portions 21 to 23 and the backbone control boxes 31 to 33 and connecting the various branch line sub-harnesses 42 to 44 to the backbone control boxes 31 to 33, it is possible to arrange various transmission lines with a simple structure similar to a spine (backbone).

For example, since it is possible to cope with various electric components to be mounted in vehicles as options or new electric components to be added by adding or changing the branch line sub-harnesses 42 to 44 to be connected to any of the backbone control boxes 31 to 33, there is no need to change the structure of the trunk line of the vehicular circuit body. In the present embodiment, it is assumed that the branch line sub-harnesses 42 to 44 are connected to the backbone control boxes 31 to 33, but for example, another branch line sub-harness (not illustrated) may be connected to appropriate relay points on the backbone trunk line portions 21 to 23.

In an actual on-vehicle device, for example, as illustrated in FIG. 1, an electronic control unit (ECU) 51 provided in the vehicle may be connected to the backbone control box 31 and other electric components via the branch line sub-harness 42. The electronic control units 51, 52, and 53 and other electric components may be connected to the backbone control box 32 via the branch line sub-harness 43. Further, various electric components may be connected to the backbone control box 33 via the branch line sub-harness 44. Each of the electronic control units 51, 52, and 53 may control various electric components on the vehicle via the communication lines of the branch line sub-harnesses 42, 43, and 44, the backbone control boxes 31 to 33, and the like.

On the other hand, the vehicular circuit body illustrated in FIG. 1 is required to perform electrical connection not only between electric components in the vehicle interior 13 but also between the main power source and electric components in the engine room 11. The dash panel 16 is disposed at a boundary between the engine room 11 and the vehicle interior 13, and a location where an electrical connection member penetrates through the dash panel 16 is required to be perfectly sealed. In other words, the dash panel is required to have functions of insulating vibration from the engine room, reducing vibration or noise from a suspension, and blocking heat, noise, and smell in order to maintain the vehicle interior to be comfortable.

However, for example, if a component which has a large sectional area and is hardly bent in directions other than a specific direction, such as the backbone trunk line portions 21 to 23, is configured to penetrate through the dash panel 16, it is considerably hard to seal the penetration location, and thus it is also difficult to perform routing work of a vehicular circuit body.

In the vehicular circuit body illustrated in FIG. 1, the backbone trunk line portions 21 to 23 and the backbone control boxes 31 to 33 which are principal constituent elements are all disposed in a space on the vehicle interior 13 side, and thus the problem of the penetration location in the dash panel 16 may be easily solved.

Actually, as illustrated in FIG. 1, the main power source cable 41 connected to the left end of the backbone control box 31 is routed to pass through a penetration hole 16a of the dash panel 16, and a circuit of the main power source in the engine room 11 is connected to a power source circuit of the backbone control box 31 via the main power source cable 41. Thus, the power of the main power source may be supplied to the backbone control box 31. Since it is possible to use a material that is easy to bend for the main power source cable 41, make the material have a circular shape, or make the sectional area of the material small, it is possible to easily seal the penetration hole 16a and to avoid deterioration of workability when performing the routing operation.

In a case where various electric components in the engine room 11 are connected to the vehicular circuit body of the vehicle interior 13, for example, a part of the branch line sub-harnesses 42 connected to the backbone control box 31 is provided to pass through the dash panel 16, or a part of the branch line sub-harnesses 44 connected to the backbone control box 33 is provided to pass through the dash panel 16, and thus a desired electrical connection path may be realized. In this case, since the branch line sub-harnesses 42 and 44 have small sectional areas and are easily bent, a location where the branch line sub-harnesses pass through the dash panel 16 may be easily sealed.

Since there is a main power supply on the engine room 11 side, regarding the branch line sub-harnesses provided at portions penetrating through the dash panel 16, it is also possible to omit the power source line and ground line and limit the branch line sub-harness to only the communication line. Such a special branch line sub-harness may be specially formed as a communication trunk line different from the branch line sub-harnesses 42 to 44 branched from the backbone trunk line.

Figure 4:
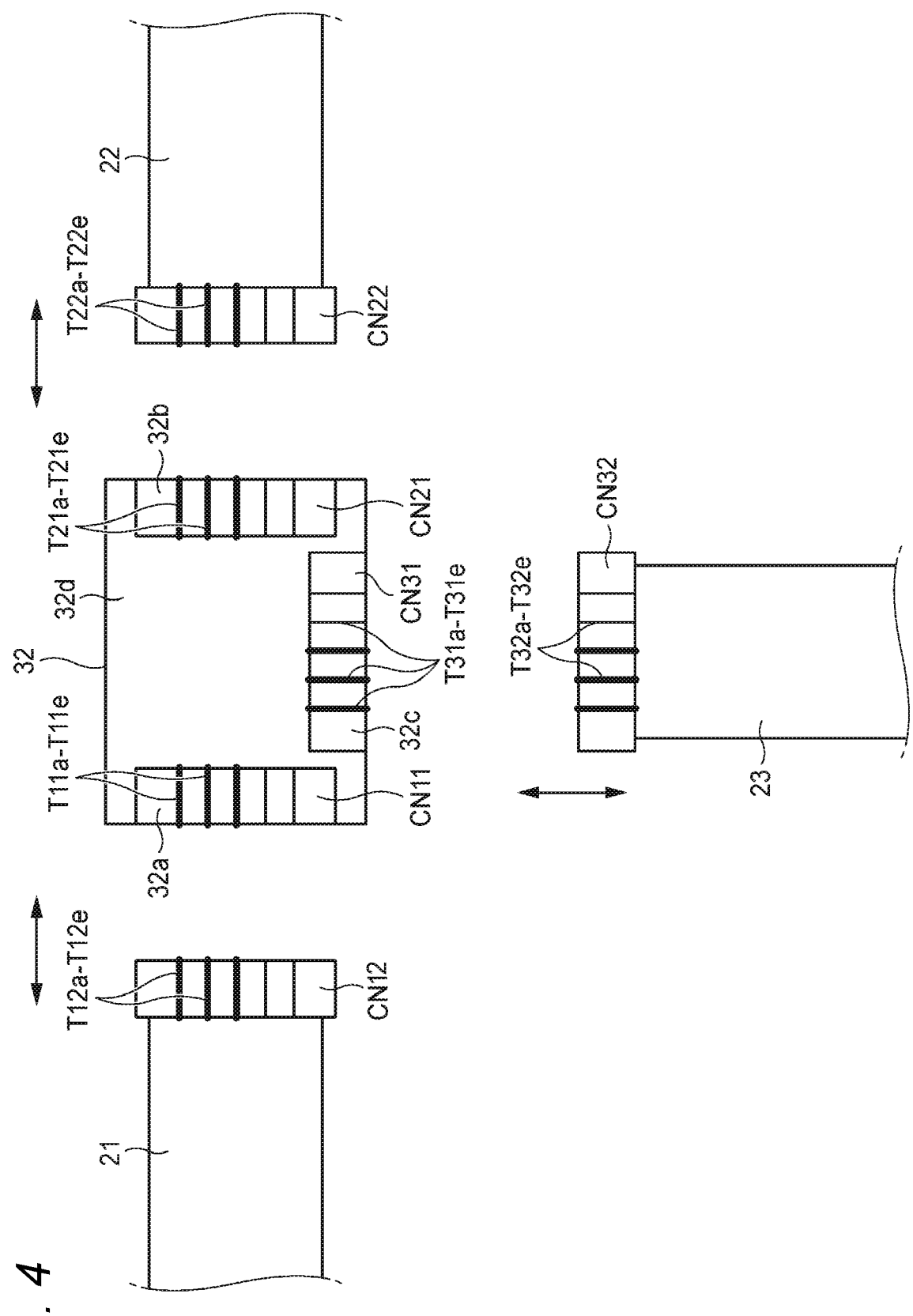
FIG. 4 is a front view illustrating a configuration of a backbone control box and the vicinity thereof.

Next, details of the vicinity of the backbone control box 32 will be described. FIG. 4 illustrates the configuration of the backbone control box 32 and the vicinity thereof.

As illustrated in FIG. 4, the backbone control box 32 is provided with a trunk line connection portion 32a provided on the left end side, a trunk line connection portion 32b provided on the right end side, and a trunk line connection portion 32c provided on the lower end side. The right end of the backbone trunk line portion 21 may be connected to the trunk line connecting portion 32a, the left end of the backbone trunk line portion 22 may be connected to the backbone connecting portion 32b, and the tip of the backbone trunk line 23 may be connected to the trunk line connection portion 32c.

Specifically, a connector CN11 provided in the trunk line connection portion 32a and a connector CN12 provided in the right end of the backbone trunk line portion 21 are detachably configured. Similarly, a connector CN 21 provided in the trunk line connection portion 32b and a connector CN22 provided in the left end of the backbone trunk line portion 22 are detachably configured. Further, a connector CN 31 provided in the trunk line connection portion 32c and a connector CN32 provided in the front end of the backbone trunk line portion 23 are detachably configured.

As with the configuration of the backbone trunk line portion 21 illustrated in FIGS. 2 and 3, each of the backbone trunk line portions 21, 22, and 23 is provided with two lines of power source lines (21a and 21b), a ground line (21c), and a communication line (21d) including two signal lines.

Two power source lines 21a and 21b of the backbone trunk line portion 21, the earth line 21c, and two signal lines of the communication line 21d are respectively connected to each of the five terminals T12a to T12e arranged side by side at positions adjacent to each other inside the connector CN12. Similarly, two power source lines of the backbone trunk line portion 22, a ground line, and two signal lines of the communication line are respectively connected to each of the five terminals T22a to T22e arranged side by side at positions adjacent to each other inside the connector CN22. Two power source lines of the backbone trunk line portion 23, a ground line, and two signal lines of the communication line are respectively connected to each of the five terminals T32a to T32e arranged side by side at positions adjacent to each other inside the connector CN32.

Inside the connector CN11 of the backbone control box 32, five terminals T11a to T11e engageable with each of the terminals T12a to T12e in the connector CN12 in a male/female relationship are arranged side by side at positions adjacent to each other. Similarly, inside the connector CN21, five terminals T21a to T21e engageable with each of the terminals T22a to T22e in the connector CN22 are arranged side by side at positions adjacent to each other. Inside the connector CN31, five terminals T31a to T31e engageable with each of the terminals T32a to T32e in the connector CN32 are arranged side by side at positions adjacent to each other.

In the backbone control box 32, a printed circuit board forming a relay circuit 32d is provided. The respective terminals T11a to T11e of the connector CN11 in the backbone control box 32, the respective terminals T21a to T21e of the connector CN21, and the respective terminals T31a to T31e of the connector CN31 are connected to the relay circuit 32d, respectively. The relay circuit 32d includes circuits for mutually connecting the power source lines (21a, 21b, and the like), the earth line (21c and the like), the communication line (21d and the like) of the backbone trunk line portions 21, 22, and 23 connected to the backbone control box 32. A function of shutting off the connection of the circuit as necessary, a function of limiting supply power, and the like may be provided in the relay circuit 32d in some cases.

Although not illustrated in FIG. 4, like the branch line connection portion 31c of the backbone control box 31, a branch line connection portion for connecting each branch line sub-harness 42 is also provided in the backbone control box 32.

As illustrated in FIG. 4, it is easy to attach and detach the backbone trunk line portions 21, 22, and 23 and the backbone control box 32 by providing the connectors CN11, CN12, CN21, CN22, CN31, and CN32. Therefore, in a case where it is difficult to install the routing along the desired path on the vehicle body in a state where these connectors are connected to each other, by removing the portions of each connector to separate the backbone trunk line portions 21, 22, and 23 and the backbone control box 32 from each other as illustrated in FIG. 4 by way of example, operations such as moving and positioning of each member becomes relatively easy.

Further, the terminals T11a to T11e of the connector CN11, the terminals T12a to T12e of the connector CN12, the terminals T21a to T21e of the connector CN21, the terminals T22a to T22e of the connector CN22, the terminals T31a to T31e of the connector CN31 and the terminals T32a to T32e of the connector CN32 are arranged side by side at positions adjacent to each other. That is, various detachable connection portions (each terminal) are disposed so as to be concentrated in a comparatively narrow space.

Therefore, when performing the mounting work for integrating the backbone trunk line portions 21, 22, and 23 and the backbone control box 32, the detaching work for disassembling the backbone trunk line portions 21, 22, and 23 and the backbone control box 32, the inspection work of each connection portion, it is possible to work only in a relatively narrow space. Therefore, for example, in the case of performing maintenance, it is possible for an operator to work only at a specific connection point, such as in the vicinity of the backbone control box 32 without having to moving around in order to search for various inspection points. Since it is possible to work by merely opening a part of the cover that covers a work target portion, the openable and closable cover may be miniaturized.

Also, like the backbone control box 32 illustrated in FIG. 4, if connectors are respectively provided at the trunk line connection portion 31b of the backbone control box 31 and the left end of the backbone trunk line portion 21, it is possible to easily attach and detach the backbone control box 31 and the backbone trunk line portion 21. The same applies to the backbone control box 32.

Next, a configuration example of the entire on-vehicle device will be described.

Figure 5:
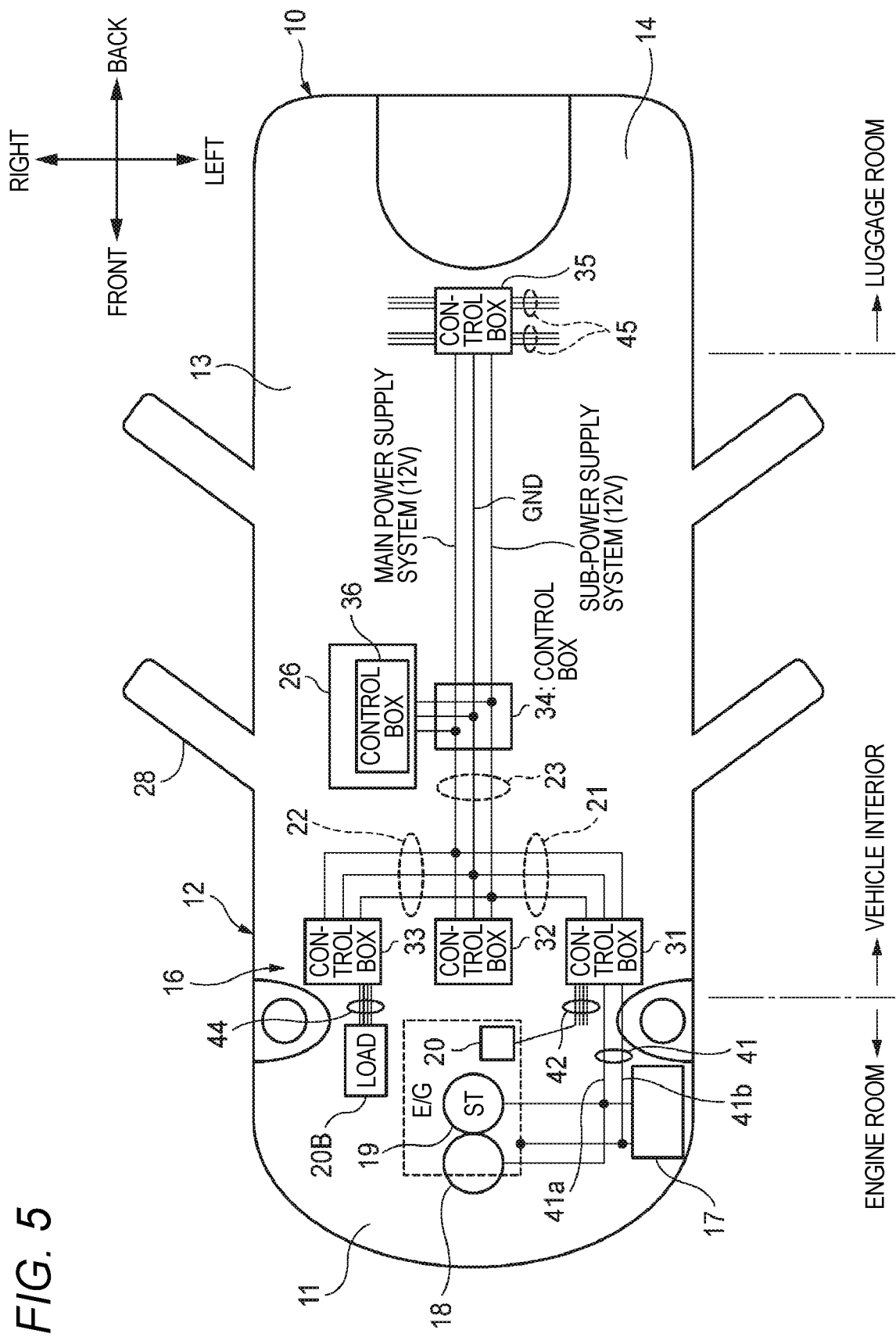
FIG. 5 is a plan view illustrating a configuration example of main portions of an on-vehicle device including the vehicular circuit body illustrated in FIG. 1.

FIG. 5 illustrates an example of the configuration of the main portions of the on-vehicle device including the vehicular circuit body illustrated in FIG. 1. As illustrated in FIG. 5, a vehicle body 10 of this vehicle is formed of three sections of an engine room 11, a vehicle interior 13, and a luggage room 14. The above-described dash panel 16 is provided at the boundary between the engine room 11 and the vehicle interior 13.

The engine room 11 is equipped with an engine E/G, a main battery 17, an alternator (ALT) 18, a starter (ST) 19, electric components 20 and 20B, and the like. The main battery 17, the alternator 18, and the like correspond to the main power source of this vehicle. As a backup of this main power source, a sub-battery 26 is provided in the vehicle interior 13.

Also in the configuration illustrated in FIG. 5, the above-described backbone control boxes 31, 32, and 33 and the backbone trunk line portions 21, 22, and 23, which are electrically connected to each other, are provided in an instrument panel portion 12 in the vehicle interior 13. Further, the back end of the backbone trunk line portion 23 extends to the luggage room 14 and is connected to the backbone control box 35. A backbone control box 34 is provided in an intermediate portion of the backbone trunk line portion 23, and the backbone control box 36 and the sub-battery 26 are connected to the trunk line branched from the backbone control box 34. Various electric components in the luggage room 14 are connected to the backbone control box 35 via the branch line sub-harness 45.

Since it is assumed that the sub-battery 26 exists in the configuration illustrated in FIG. 5, each of the backbone trunk line portions 21, 22, and 23 includes a main power source system and a sub (backup) power source system as power source lines. That is, as illustrated in FIGS. 2 and 3, two power source lines (21a, 21b, and the like) are provided in each of the backbone trunk line portions 21, 22, and 23.

Therefore, in a case where some trouble occurs and power supply from the main power source is stopped, the power of the sub-battery 26 may be supplied to the electric components with high importance via the backbone trunk line portions 21, 22, and 23. Therefore, it is possible to minimize the stoppage of operations of various in-vehicle devices at the time of occurrence of abnormality, and for example, it is possible to realize high reliability required for a vehicle or the like equipped with an automatic driving function.

Also in the configuration illustrated in FIG. 5, the backbone control box 31 in the vehicle interior 13, the main battery 17, the alternator 18 which are the main power sources in the engine room 11 are connected via the main power source cable 41. Therefore, the main power source cable 41 is routed so as to penetrate the dash panel 16.

A part of the branch line sub-harness 42 connected to the backbone control box 31 disposed in the vehicle interior 13 penetrates the dash panel 16 and is connected to the electric component 20. A part of the branch line sub-harness 44 connected to the backbone control box 33 disposed in the vehicle interior 13 penetrates the dash panel 16 and is connected to the electric component 20B (load).

<Advantages of Vehicular Circuit Body>

As illustrated in FIG. 4, the terminals T11a to T11e, T12a to T12e, T21a to T21e, T22a to T22e, T31a to T31e, and T32a to T32e are arranged adjacent to each other in each of the connection portions between the backbone control box 32 and the backbone trunk line portions 21, 22, and 23. Therefore, when the operator performs a connection operation, a disassembly operation, an inspection operation, a component replacement operation, and the like, it is possible to perform work only in a specific space concentrated as a work portion.

As illustrated in FIG. 4, since the connectors CN11, CN12, CN21, CN22, CN31, and CN32 are used at the connection part, attachment and detachment of each part is easy. Therefore, for example, when the vehicular circuit body is assembled to the vehicle body as illustrated in FIG. 1, the backbone control box 32 and each of the backbone trunk line portions 21, 22, and 23 may be individually moved and positioned as independent parts separated from each other. Therefore, good workability may be obtained as compared with the case where the backbone control box 32 and the backbone trunk line portions 21, 22, and 23 are integrated beforehand.

Moreover, by using the vehicular circuit body having a structure which is simplified like a spine, manufacturing costs for devices, and costs for routing operations may be reduced. In addition, since it is unnecessary to change the basic configuration for the presence or absence of optional electric components and for new electrical components to be added, it is easy to share components and configurations.

The above configuration as illustrated in FIGS. 1 and 5 illustrates an example in which the backbone trunk line portion is configured as a T-shape and may be configured in other shapes. For example, the backbone control boxes 32 and 35 and the backbone trunk line portion 23 may be configured as an I type only.

Here, the features of the embodiment of the vehicular circuit body according to the present invention described above are summarized briefly in the following [1] to [7], respectively.

[1] A vehicular circuit body provided in a vehicle, including:

a plurality of control units (backbone control boxes 31, 32, and 33);

a trunk line (backbone trunk line portions 21, 22, and 23) that connect the plurality of control units to each other; and a branch line (branch line sub-harness 42) that directly or indirectly connects one of the plurality of control units to an accessory, in which the trunk line has a power source line (21a) and a communication line (21d), and the control unit has a trunk line connection portion (trunk line connection portions 31b, 32a, 32b, and 32c) to which the trunk line is connected, and a branch line connection portion (trunk line connection portion 31c) to which the branch line is connected.

[2] In the vehicular circuit body according to the above [1], the plurality of control units include:

a first control unit (backbone control box 32); and a second control unit (backbone control boxes 34 and 35) that is disposed to be separated from the first control unit in a front or rear direction of the vehicle, and the trunk line is configured by a first trunk line (backbone trunk line portion 23) that connects the first control unit and the second control unit to each other.

[3] In the vehicular circuit body according to the above [2], each of the plurality of control units further includes:

a third control unit (backbone control box 31) that is disposed to be separated from the first control unit in a vehicle width direction of the vehicle; and a fourth control unit (backbone control box 33) that is disposed to be separated from the first control unit in the vehicle width direction, and at a position that is on a side opposite to the third control unit, and the trunk line further includes:

a second trunk line (backbone trunk line portion 21) that connects the first control unit and the third control unit to each other, and a third trunk line (backbone trunk line portion 22) that connects the first control unit and the fourth control unit to each other.

[4] In the vehicular circuit body according to any one of the above [1] to [3], the vehicle has a first region (vehicle interior 13) including a vehicle interior, and a second region (engine room 11) that is different from the first region, the plurality of control units are disposed in the first region, and one of the plurality of control units has a power input terminal (main power connection portion 31a) to which power is supplied from a power source, and the control unit supplies the power that is received from the power input terminal, to the trunk line.

[5] In the vehicular circuit body according to any one of the above [1] to [4], the power source line has a first power source line (power source line 21a), and a second power source line (power source line 21b) that is used as a backup for the first power source line, an end portion of the power source line includes an end portion of the first power source line and an end portion of the second power source line, and the power source terminal includes a first power supply terminal (terminal T11a) to which the first power source line is connected and a second power source terminal (T11b) to which the second power source line is connected.

[6] In the vehicular circuit body according to the above [5], each of the first power source line and the second power source line is configured by a strip metal material having a flat sectional shape, and the trunk line has a structure in which the metal materials of the first power source line and the second power source line are stacked in a thickness direction with an insulator interposed therebetween.

[7] In the vehicular circuit body according to any one of the above [1] to [6], the trunk line further includes an earth line (21c).

While the present invention is described in detail by referring to the specific embodiments, it is to be understood to a person with ordinary skill in the art that various changes or modifications may be made without deviating from the spirit and scope of the present invention.

This application is based on Japanese Patent Application (Japanese Patent Application No. 2016-125896) filed on Jun. 24, 2016, the contents of which are incorporated herein by reference.

INDUSTRIAL APPLICABILITY

According to the present invention, it is possible to provide a vehicular circuit body that may simplify the configuration of the trunk line portion and may easily add new wires. The present invention which exerts this effect is useful with respect to a vehicular circuit body routed in a vehicle.

REFERENCE SIGNS LIST

10: vehicle
11: engine room
12: instrument panel portion
13: vehicle interior
13a: vehicle interior floor portion
14: luggage room
16: dash panel
16a: penetration hole
17: main battery
18: alternator
19: starter
20, 20B: electric component
21, 22, 23: backbone trunk line portion
21a, 21b: power source line
21c: earth line
21d: communication line
26: sub-battery
31, 32, 33, 34, 35, 36: backbone control box
31a: main power source connection portion
31b, 32a, 32b, 32c: trunk line connection portion
31c: branch line connection portion
31d, 32d: relay circuit
41: main power source cable
41a: power source line
41b: earth line
42, 43, 44, 45: branch line sub-harness
51, 52, 53: electronic control unit
CN11, CN12, CN21, CN22, CN31, CN32: connector
T11a to T11e, T12a to T12e, T21a to T21e: terminal
T22a to T22e, T31a to T31e, T32a to T32e: terminal

The invention claimed is:

1. A vehicular circuit body provided in a vehicle including an engine room, a vehicle interior, a dash panel that separates the engine from the vehicle interior, and a floor that extends along the vehicle interior, the vehicular circuit body comprising:
a plurality of control units;
a trunk line that connects the plurality of control units to each other; and
a branch line that directly or indirectly connects one of the plurality of control units to an accessory,
wherein the trunk line has a first power source line and a communication line,
wherein at least one of the control units has a trunk line connection portion to which the trunk line is connected, and a branch line connection portion to which the branch line is connected,
wherein the at least one of the control units is mounted adjacent to the dash panel and spaced away from the floor
wherein the plurality of control units includes:
a first control unit that is disposed at a center in right-left direction of the vehicle,
a second control unit that is disposed to be separated from the first control in a front-to-rear direction of the vehicle, and is disposed at the center in the right-left direction of the vehicle,
a third control unit that is disposed to be separated from the first control unit in a vehicle width direction of the vehicle, and is disposed near a left end in the right-left direction of the vehicle,
a fourth control unit that is disposed to be separated from the first control unit in the vehicle width direction, and at a position opposite to the third control unit, and
wherein the trunk line includes:
a first trunk line portion that extends in the front-to-rear direction of the vehicle and connects the first control unit and the second control unit to each other,
a second trunk line portion that extends in the right-left direction of the vehicle and connects the first control unit and the third control unit to each other, and
a third trunk line portion that extends in the right-left direction of the vehicle and connects the first control unit and the fourth control unit to each other.

2. The vehicular circuit body according to claim 1, wherein the vehicle has a first region including a vehicle interior, and a second region that is different from the first region,
wherein the plurality of control units are disposed in the first region, and
wherein one of the plurality of control units has a power input terminal to which power is supplied from a power source, and the one of the plurality of control units supplies the power that is received from the power input terminal, to the trunk line.

3. The vehicular circuit body according to claim 1, wherein the trunk line includes a second power source line that is used as a backup for the first power source line.

4. The vehicular circuit body according to claim 3, wherein each of the first power source line and the second power source line is made of a strip metal material having a flat sectional shape, and
wherein the first power source line and the second power source line are stacked in a thickness direction with an insulator interposed therebetween.

5. The vehicular circuit body according to claim 1, wherein the trunk line further includes an earth line.

6. The vehicular circuit body according to claim 1, wherein the first control unit is mounted adjacent to a center portion of the dash panel in the vehicle width direction,
wherein the second control unit is mounted on a center portion of the floor in the vehicle width direction, and
wherein the first trunk line portion extends along the center portion of the vehicle in the front-to-rear direction of the vehicle.

7. The vehicular circuit body according to claim 6, wherein the third control unit and the fourth control unit are mounted adjacent to the dash panel such that the first control unit is located between the third and fourth control units, and
wherein the plurality of control units and the trunk line form a T-shape.

8. The vehicular circuit body according to claim 7, wherein the first trunk line portion includes a bend such that the first trunk line portion extends from the floor to a position above the floor and adjacent to the dash panel.

9. The vehicular circuit body according to claim 8, further comprising:
a first power source;
a first power source supply line extending from and connected to each of the power source and the third control unit;

a second power source; and a second branch line that extends from the second power source to the second control unit and electrically connects the second power source to the trunk line, wherein the third control unit electrically connects the first power source to the first power source line.

10. The vehicular circuit body according to claim 9, wherein the plurality of control units includes:
   a fifth control unit connected to the second control unit by the second branch line, and
   a sixth control unit located on the center portion of the floor, connected to the first trunk line portion, and spaced away from the second control unit in the front-to-rear direction such that the second control unit is located between the first control unit and the sixth control unit, and
wherein the first trunk line portion extends in the front-to-rear direction of the vehicle from the first control unit to the second control unit and from the second control unit to the sixth control unit.

\* \* \* \* \*